(12) United States Patent
Perdrizet et al.

(10) Patent No.: US 10,252,781 B2
(45) Date of Patent: Apr. 9, 2019

(54) FLOATING MOUNTING HAVING A DEPTH-VARIABLE HORIZONTAL CROSS-SECTION

(71) Applicant: IFP Energies nouvelles, Rueil-Malmaison (FR)

(72) Inventors: Timothee Perdrizet, Lyons (FR); Pauline Bozonnet, Paris (FR); Philippe Gilbert, Paris (FR); Claude Mabile, Clamart (FR); Gerard Papon, Les Essarts le Roi (FR); Yann Poirette, Reventin-Vaugris (FR); Alice Pourtier, Fontenay St Pere (FR); Navid Saeedi, Alfortville (FR); Victor Dupin, Paris (FR); Thierry Bancel, Pont Salomon (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/567,843

(22) PCT Filed: Apr. 12, 2016

(86) PCT No.: PCT/EP2016/058003
§ 371 (c)(1),
(2) Date: Oct. 19, 2017

(87) PCT Pub. No.: WO2016/169811
PCT Pub. Date: Oct. 27, 2016

(65) Prior Publication Data
US 2018/0118309 A1 May 3, 2018

(30) Foreign Application Priority Data
Apr. 22, 2015 (FR) .................................. 15 53611

(51) Int. Cl.
*B63B 35/44* (2006.01)
*B63B 1/04* (2006.01)
(Continued)

(52) U.S. Cl.
CPC ................ *B63B 35/44* (2013.01); *B63B 1/04* (2013.01); *F03D 13/25* (2016.05);
(Continued)

(58) Field of Classification Search
CPC ...... B63B 35/44; B63B 1/04; B63B 2035/446
See application file for complete search history.

(56) References Cited

U.S. PATENT DOCUMENTS 9,499,240 B2 * 11/2016 Bussemaker ......... E02B 17/021
2004/0040487 A1 * 3/2004 Kristensen ............. B63B 1/107
114/265

(Continued)

FOREIGN PATENT DOCUMENTS

FR 2990005 A1 11/2013
FR 2990477 A1 11/2013

(Continued)

OTHER PUBLICATIONS

International Search Report for PCT/EP2016/058003, dated May 20, 2016; English translation submitted herewith (5 pgs.).

*Primary Examiner* — S. Joseph Morano
*Assistant Examiner* — Jovon E Hayes
(74) *Attorney, Agent, or Firm* — Fitch, Even, Tabin & Flannery, LLP

(57) ABSTRACT

The present invention relates to a floating mounting (1) which includes ballasting means (2) in order to vary the draught of the floating mounting. The floating mounting (1) according to the invention has a depth-variable horizontal cross-section, such that the second moment of area of the cross-section of the floating mounting, at the buoyancy
(Continued)

surface (Sd), is higher when the floating mounting is deballasted, compared with the second moment of area of the buoyancy surface of the floating mounting, at the buoyancy surface (Sb), when the floating mounting is ballasted.

19 Claims, 8 Drawing Sheets

(51) Int. Cl.
  *F03D 13/25* (2016.01)
  *F03D 13/20* (2016.01)
(52) U.S. Cl.
  CPC ..... *B63B 2035/446* (2013.01); *B63B 2207/02* (2013.01); *F03D 13/20* (2016.05); *F03D 13/22* (2016.05); *F05B 2240/95* (2013.01); *F05B 2240/97* (2013.01); *Y02E 10/727* (2013.01)

(56) References Cited

U.S. PATENT DOCUMENTS

| | | | | |
|---|---|---|---|---|
| 2014/0167421 | A1* | 6/2014 | Mabile | F03D 13/22 290/55 |
| 2015/0071779 | A1* | 3/2015 | Averbuch | F03D 7/02 416/85 |
| 2016/0101833 | A1* | 4/2016 | Gilloteaux | B63B 1/048 416/85 |
| 2018/0118309 | A1* | 5/2018 | Perdrizet | B63B 1/04 |

FOREIGN PATENT DOCUMENTS

| | | | |
|---|---|---|---|
| FR | 2999662 A1 | 6/2014 | |
| FR | 3005698 A1 | 11/2014 | |
| GB | 2292348 A * | 2/1996 | ............... B63B 5/14 |
| GB | 2292348 A | 2/1996 | |
| GB | 2481321 A * | 12/2011 | ......... B63B 35/4413 |
| GB | 2481321 A | 12/2011 | |
| WO | 02/28704 A1 | 4/2002 | |

* cited by examiner

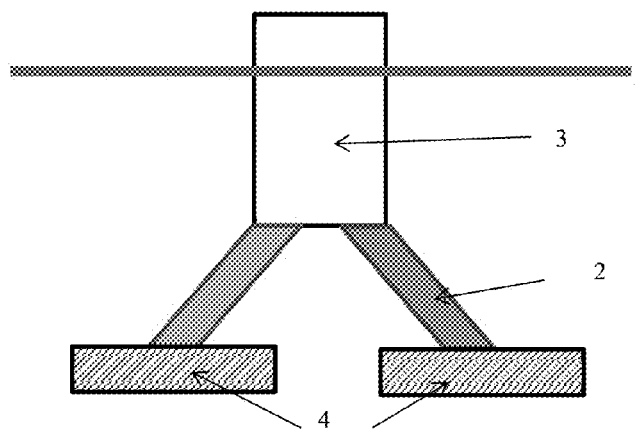
Figure 4e
Figure 5a
Figure 5b
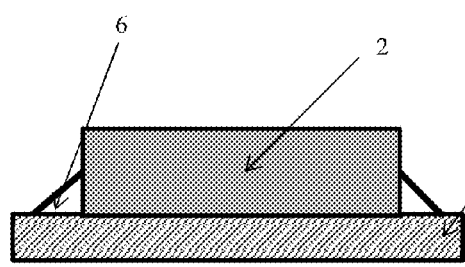
Figure 5c
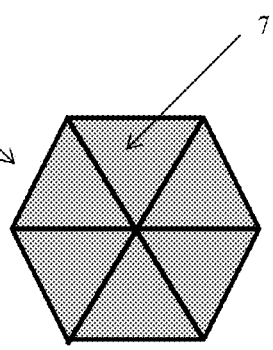
Figure 5d

FLOATING MOUNTING HAVING A DEPTH-VARIABLE HORIZONTAL CROSS-SECTION

CROSS-REFERENCE TO RELATED APPLICATIONS

This application is a U.S. national phase application filed under 35 U.S.C. § 371 of International Application No. PCT/EP2016/058003, filed Apr. 12, 2016, designating the United States, which claims priority from French Patent Application No. 15/53.611, filed Apr. 22, 2015, which are hereby incorporated herein by reference in their entirety.

The present invention concerns the field of offshore floating supports, in particular for offshore wind turbines.

In the case of offshore wind turbines, the part of the floating support above the water supports the wind turbine, which comprises the blades, the rotor, the nacelle and the tower fixed to the floating support. These floating supports can be anchored to the seabed by taut, semi-taut or catenary anchor lines. The object of the floating support is to provide the buoyancy and the stability of the wind turbine so as to absorb the forces exerted thereon whilst limiting the movements of the structure as a whole.

Various floating supports dedicated to the installation of multi-megawatt wind turbines in coastal waters are being developed in many countries. Depending on the depth at the site concerned, a number of design options can be envisaged. Despite their great diversity, a number of floating support families are emerging. There may be cited:

SPAR type floats, characterized by a slender geometrical shape and including a large ballast in order to lower the center of gravity of the structure as a whole as much as possible and thus to ensure stability (this is referred to as mass stability), barge type floats: these are very wide supports with a shallow draft. Their stability is provided by their large buoyancy surface (this is referred to as shape stability); this type of support is very sensitive to swell, however, TLP (Tension Leg Platform) type supports that have the particular feature of being moored to the seabed by taut lines guaranteeing the stability of the structure, semi-submersible type floats: these are supports consisting of at least three floats connected by arms in order to impart stiffness. These supports generally have a shallow displacement and a high second moment of area of the buoyancy surface, therefore achieving a restoring torque sufficient to stabilize them. Moreover, this type of float is less sensitive to swell than barges.

Determining the dimensions of the floating supports is a difficult and recurrent problem with multiple constraints, as they must be adapted to each application (the constraints being very different from one application to another) and to the environmental conditions of the site or sites on which they are installed (wind, swell, etc.). For example, the patent applications FR 2990005 (WO 2013160579), FR 2990477 (WO 2013167820) and FR 2999662 (US 2014167421) propose diverse solutions to these problems entailing modification of the anchoring, interconnection of the floats or inclination of the float.

Moreover, the patent application FR 3005698 (WO 2014184454) discloses an offshore wind turbine floating support including a permanent ballast and a dynamic ballast for satisfying the static stability criteria. However, this floating support does not allow the installation of the wind turbine on the support in shallow water, for example at the quayside.

To this end, and in order to achieve stability of the floating support for different depths of water, the present invention concerns a floating support that includes ballasting means for varying the draft of the floating support. The floating support according to the invention has a horizontal section varying with depth so that the second moment of area of the cross-section of the floating support at the level of the buoyancy surface is higher when the floating support is deballasted compared to the second moment of inertia of the buoyancy surface of the floating support, at the level of the buoyancy surface when the floating support is ballasted. This ensures the stability of a floating support with a shallow draft, resulting mainly from shape stability. In the ballasted position, the stability of the floating support results from both mass stability and shape stability.

The Device According to the Invention

The invention concerns a floating support including means for ballasting and deballasting the floating support to vary the draft of said floating support, said floating support having a cross-section varying with depth. The second moment of area of said cross-section of said floating support at the level of the buoyancy surface of said floating support when deballasted is greater than the second moment of area of said cross-section of said floating support at the level of the buoyancy surface of said floating support when ballasted.

According to the invention, said cross-section of the floating support at the level of said buoyancy surface of said deballasted floating support is greater than said cross-section of said floating support at the level of said buoyancy surface of said ballasted floating support.

According to one embodiment of the invention, said floating support includes a lower part containing a permanent ballast, an intermediate part containing said ballasting and deballasting means, and an upper part containing buoyancy means, said buoyancy surface of said deballasted floating support being at the level of said intermediate part and said buoyancy surface of said ballasted floating support being at the level of said upper part.

In a horizontal plane of said floating support, the exterior dimension of said intermediate part is advantageously smaller than the exterior dimension of said lower part and larger than the exterior dimension of said upper part.

According to one variant, said permanent ballast is made of reinforced concrete or includes a metal structure filled with a dense material such as concrete or iron filings.

Said lower part preferably has a substantially frustoconical, toroidal, parallelepipedal, cylindrical or polygonal shape.

Said lower part advantageously includes a plurality of assembled modules.

According to one concept of the invention, said intermediate part includes an at least partly watertight steel shell.

Alternatively, said intermediate part includes a concrete shell.

According to one feature of the invention, the ballast of said ballasting means includes water.

According to one embodiment of the invention, said intermediate part is formed by a solid cylinder, a tube, a torus or by a plurality of modules distributed continuously or discontinuously on the lower part.

According to one aspect of the invention, said intermediate part is formed by a steel structure and a plurality of modules.

According to one variant, said intermediate part is at least partly demountable so as to be removed when the floating support is ballasted.

Moreover, said floating support can include a transition module providing the transition between said intermediate part and said upper part.

Said transition module advantageously has a substantially conical or frustoconical shape.

Said transition module is preferably arranged around the upper part.

Moreover, said transition module can be arranged above at least one module forming said intermediate part.

According to one feature of the invention, said upper part is made of low-density concrete, steel or a steel/composite mix.

According to one aspect of the invention, said upper part includes a plurality of modules.

The invention moreover concerns a wind turbine installation on a body of water comprising a wind turbine and a floating support having any one of the above features, said wind turbine being installed on said floating support.

BRIEF DESCRIPTION OF THE DRAWINGS

Other features and advantages of the method according to the invention will become apparent on reading the following description of nonlimiting embodiments with reference to the appended figures described below.

FIGS. 4a to 4e show variants of the floating support in the ballasted position.

FIGS. 5a to 5d show variants of the permanent ballast of the floating support.

DETAILED DESCRIPTION OF THE INVENTION

Figure 1:
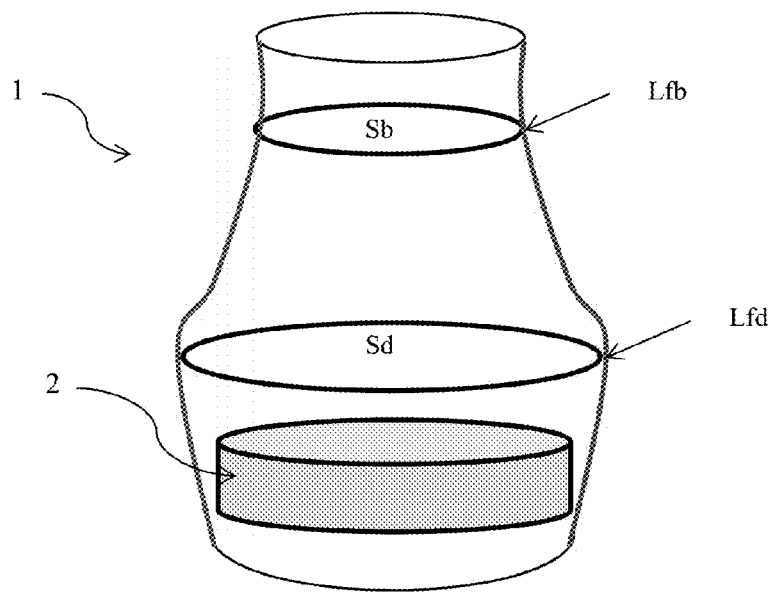
FIG. 1 shows a floating support according to one embodiment of the invention.

The present invention concerns a floating support. The floating support can be used as a foundation for an offshore wind turbine but can be equally suitable for use in other fields, such as offshore recovery of hydrocarbons, or for the recovery of marine energy (thermal energy, swell, currents, etc.).

The floating support according to the invention includes means for ballasting and deballasting the floating support enabling the draft of the floating support to be varied. The draft is the vertical dimension of the underwater part of the floating support. It corresponds to the vertical distance between the buoyancy surface and the lowest point of the floating support. Variation of the draft therefore enables adjustment of the depth to which the floating support is submerged: for example for installation, maintenance and dismantling operations in harbors the draft must be shallow (because the water there is shallow), whereas it is preferable to have a deeper draft when the floating support is in position and anchored to the seabed to improve the stability and the dynamic behavior of the float. The ballasting and deballasting means advantageously allow seawater to enter the floating support so as to increase the weight of the floating support and thus increase the draft. Instead of seawater, the ballasting and deballasting means can contain a material (for example a fluid of sufficient density, iron filings, sand, etc.) that can be removed to enable deballasting and thus reduction of the draft. The ballasting and deballasting means are preferably disposed in the bottom part of the floating support to improve mass stability when ballasted.

According to the invention, the floating support has a horizontal cross-section varying with depth. The floating support is designed so that the second moment of area of the buoyancy surface when the floating support is deballasted is greater than the second moment of area of the buoyancy surface of the ballasted floating support. The cross-section of the floating support at the level of the buoyancy surface corresponds to the horizontal cross-section at sea level (at the level of the waterline). The second moment of area is a parameter that characterizes the geometry of a cross-section and is defined relative to an axis or a point; according to the invention the point or axis corresponds to the axis of the wind turbine. The second moment of area I of a cross-section S can be determined by a formula of the form:

$$I = \int_S y^2 \cdot ds$$

with y the distance between the reference point or axis and a point of the surface. For example, the second moment of area I of a cylinder of diameter D can be determined by a formula of the following type $$I = \frac{\pi \cdot d^4}{64}$$

According to the invention, the second moment of area is therefore greater when the floating support is deballasted (with a shallow draft) than when the floating support is ballasted, which makes it possible to impart stability to the floating support and the wind turbine (or the system to be installed on the floating support) in shallow water (with shallow draft). The shallow draft in the float deballasted position therefore makes it possible to carry out installation, maintenance and dismantling operations in shallow water in a harbor (at the quayside for example). In the deballasted position the stability of the floating support equipped with the wind turbine (or the installed offshore system) mainly results from shape stability.

In the ballasted position shape stability is reduced but this is compensated by an increased mass stability that results from a lower position of the center of gravity thanks to the additional ballast. The heave hydrostatic stiffness (the sum of the shape and mass stiffnesses) of the float is therefore reduced while that in pitch and roll is increased. This enables the stability of the floating wind turbine to be guaranteed, including in respect of the high thrust generated by the wind turbine when operating. Moreover the movements of the float in the ballasted position are limited on the one hand by virtue of the reduced heave hydrostatic stiffness, which enables a significant increase in the natural periods, and on the other hand by virtue of a smaller buoyancy surface, which enables limitation of the excitation forces generated by swell.

During the transition phase between the completely ballasted and completely deballasted positions, i.e. when the waterline is located in an intermediate position, the stability of the float can result from the geometry of the float, which can be determined so that the heave, pitch and roll stiffness curves as a function of the draft are substantially continuous.

The floating support according to the invention therefore has geometrical and mass characteristics making it possible to make use of both shape stability and mass stability.

FIG. 1 shows a floating support 1 according to one embodiment of the invention. FIG. 1 shows by way of nonlimiting example a variant of the cross-section of the floating support 1 as a function of depth. The floating support 1 includes ballasting means 2. The average level of the waterline in the deballasted position is shown by the reference Lfd. The average level of the waterline in the ballasted position is shown by the reference Lfb. Thanks to the variable cross-section of the floating support, which decreases between the lines Lfd and Lfb, the cross-section Sb and the second moment of area of the buoyancy surface of the floating support when ballasted are respectively less than the section Sd and the second moment of area of the buoyancy surface of the floating support when deballasted.

According to one embodiment of the invention, the floating support comprises:
- a lower part that contains a permanent ballast that constitutes a mass fixed to the base of the floating support to provide mass stability. The lower part preferably contains heavy materials such as concrete.
- an intermediate part that includes the ballasting means, also serving as deballasting means. This intermediate part corresponds to a first ballastable buoyancy module. During installation and maintenance phases, or more generally when a shallow draft is temporarily required, this module is deballasted and the buoyancy surface is at the level of this module. It therefore provides the overall buoyancy. The stability of the float is then mainly the result of its shape stability that results from its second moment of area at the buoyancy surface. If the depth of water is sufficient, the draft is increased by completely ballasting the module with seawater or another fluid or a dense material, which enables the draft to be increased and the performance of the float to be improved in terms of stability and dynamic behavior. The module no longer provides buoyancy or hydrostatic shape stiffness, but contributes to mass stability.
- an upper part, termed the main float, which corresponds to the main buoyancy module. It provides the buoyancy of the floating support equipped with a wind turbine or any other system installed on the floating support when the float is ballasted. The upper part is preferably of lightweight construction so as not to compromise the mass stability of the structure as a whole.

The terms "lower/upper" are to be understood in the vertical direction of the floating support in its position of use: the permanent ballast of the lower part is deeply submerged and the upper part projects partly above the surface of the water. The intermediate part is placed between the ends of the lower and upper parts.

In the deballasted position, the average waterline is at the level of the intermediate part and the intermediate part is therefore partially above water. In the ballasted position the average waterline is at the level of the main float (upper part) and the intermediate part is therefore completely submerged.

In the horizontal plane the dimensions of the intermediate part are preferably smaller than the dimensions of the lower part and greater than the dimensions of the upper part. The cross-section and therefore the second moment of area at the level of the buoyancy surface are therefore greater in the deballasted position than in the ballasted position. For example, with three parts of substantially cylindrical shape, the diameter of the lower part is greater than the diameter of the intermediate part which is in turn greater than the diameter of the upper part.

Moreover, the floating support according to this embodiment of the invention can optionally include a transition module that makes it possible to produce the geometrical transition between the intermediate part and the upper part. During ballasting/deballasting operations the transition module provides continuity of the hydrostatic stiffness of the support as a function of the draft. Its geometry is defined so that the stability of the float is assured whatever the draft. The transition module can be ballastable or non-ballastable.

Figure 2:
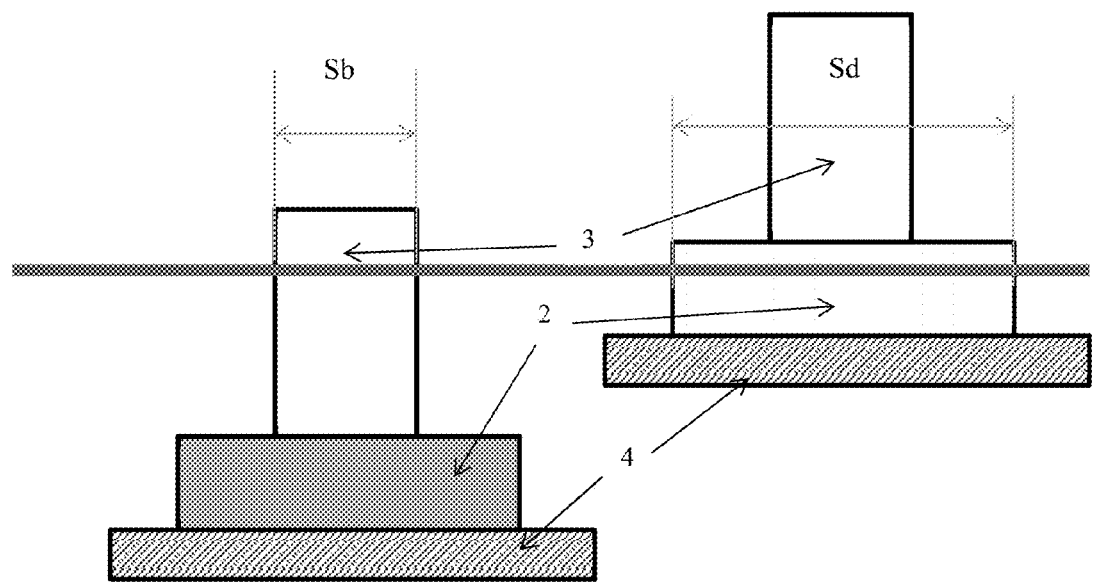
FIG. 2 shows a floating support according to one embodiment of the invention in the ballasted position (left-hand figure) and in the deballasted position (right-hand figure).

FIG. 2 shows a nonlimiting example of this embodiment with no transition module. The left-hand figure corresponding to a ballasted position and the right-hand figure to a deballasted position. The floating support includes a lower part 4, an intermediate part 2 and an upper part 3. These three parts are represented diagrammatically but they can take any of the shapes of the variants described hereinafter. According to FIG. 2, the dimensions of the intermediate part 2 are smaller than the dimensions of the lower part 4 and greater than the dimensions of the upper part 3. In the deballasted position (right-hand figure) the intermediate part 2 does not contain ballast, the buoyancy line is at the level of the intermediate part 2, and the draft is shallow. Moreover, the cross-section Sd at the level of the buoyancy surface is that of the intermediate part 2. In the ballasted position (left-hand figure) the intermediate part 2 contains ballast, the buoyancy line is at the level of the upper part 3, and the draft is deep. Moreover, the cross-section Sb at the level of the buoyancy surface is that of the upper part 3. Given that in this embodiment the horizontal cross-section of the intermediate part 2 is greater than the horizontal cross-section of the upper part 3, the cross-section Sd is greater than the cross-section Sb.

Figure 3:
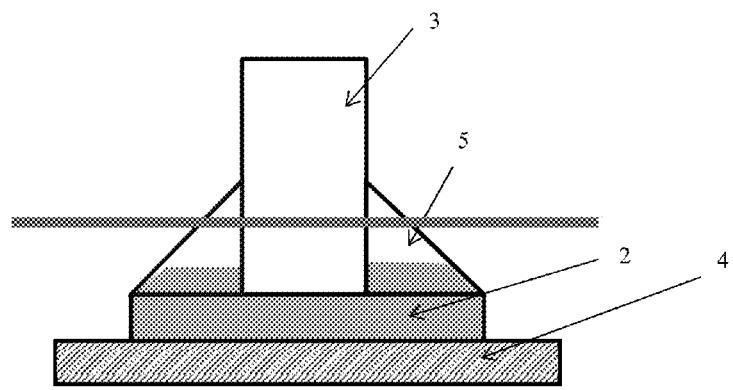
FIG. 3 shows a variant of the floating support in the ballasted position.

FIG. 3 shows a variant of the FIG. 2 floating support that further includes a transition module 5 providing a geometrical transition between the intermediate part 2 and the upper part 3. As shown, but not in a limiting manner, the transition module can be ballasted and has a frustoconical shape that continuously connects the diameter of the intermediate part 2 to the diameter of the upper part 3.

The remainder of the description describes and shows a number of variants of this embodiment (floating support with lower part, intermediate part and upper part). Variants that are technologically compatible can be combined with one another to combine their effects. In particular, the transition module can be added to all the variants that do not include one.

According to one variant the main float (the upper part) passes through the intermediate part, which enables the permanent ballast of the lower part to absorb directly the mass and the forces of the wind turbine (or the installed offshore system).

Figures 4A, 4B:
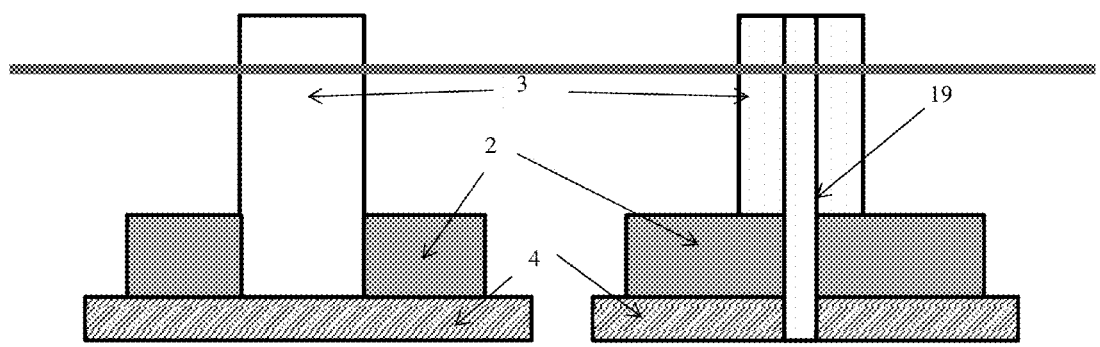

FIG. 4a shows an example of this variant in which the upper part 3 passes through the intermediate part 2 and is arranged on the lower part 4. The intermediate part 2 then includes an opening enabling the passage of the upper part 3.

According to one aspect of the invention, a central tube can pass through the three parts, notably for the passage of cables, such as electric cables.

FIG. 4b shows an example of this variant in which a central tube 19 passes through the upper part 3, the intermediate part 2 and the lower part 4.

According to one feature of the invention the lower part can pass through the intermediate part. The lower part (with the permanent ballast) can also have a dimension less than or equal to the dimension of the intermediate part. Alternatively, the lower part can have a dimension greater than the dimension of the intermediate part.

Figures 4C, 4D:
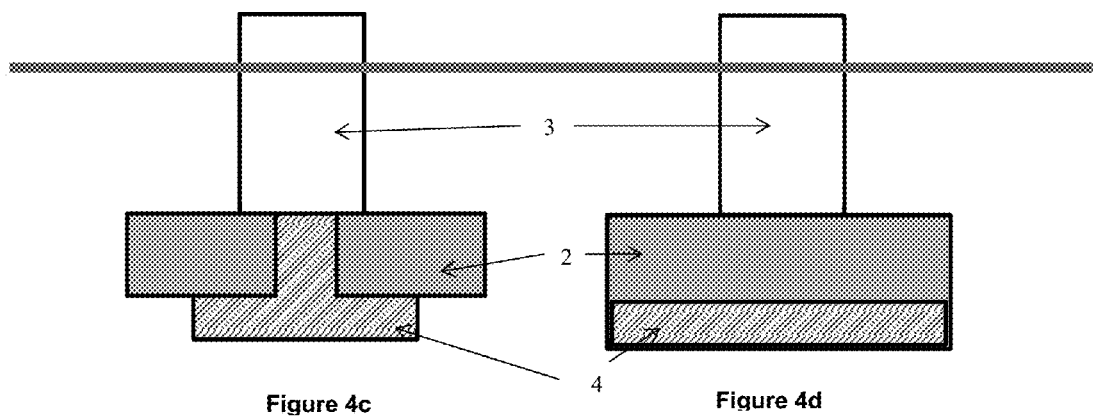

FIG. 4c shows an example of this variant in which the lower part 4 passes through the intermediate part 2. In the horizontal plane the lower part 4 has a dimension less than the dimension of the intermediate part 2.

FIG. 4d shows an embodiment of the invention in which the lower part 4 including the permanent ballast is integrated into the intermediate part 2. In this case the permanent ballast is smaller than that of the intermediate part 2.

FIG. 4e shows an embodiment of the invention in which the cross-sections and second moments of area of the buoyancy surface are not correlated. The ballasted cross-section Sb is therefore larger than the deballasted section Sd and the second moment of area of the ballasted buoyancy surface Ib is lower than the second moment of area of the deballasted buoyancy surface Id.

The permanent ballast can equally make it possible to create added water mass and hydrodynamic damping respectively to increase the natural periods of the float by offsetting them outside periods in which swell is present and to reduce the amplitudes of movement of the floating support caused by waves. To this end in the horizontal plane its dimension is greater than the dimension of the intermediate part and/or that of the upper part.

Moreover, from a structural point of view, the permanent ballast enables absorption of the mass of the wind turbine (or the installed offshore system) and some of the forces on the wind turbine generated by the wind.

The permanent ballast is advantageously a heavy material. For example, the permanent ballast can be reinforced concrete. Alternatively the permanent ballast consists of a metal, preferably steel, structure filled with a heavy material such as concrete or iron filings.

According to one configuration of the invention, the permanent ballast can have a substantially cylindrical shape. FIG. 5a shows one example of this variant with the lower part 4 including a cylindrical permanent ballast.

According to another concept, the permanent ballast can have a substantially frustoconical shape. FIG. 5b shows an example of this variant in which the lower part 4 includes a frustoconical permanent ballast.

According to variants that are not shown the permanent ballast and therefore the lower part can have a substantially toroidal, parallelepipedal, cubic, polygonal, etc. shape.

According to one possibility, the lower part can be connected to the intermediate part by means of reinforcements. FIG. 5c shows one example of this variant with one or more reinforcements 6 arranged between the lower part 4 and the intermediate part 2. Alternatively the lower part can be connected to the upper part by means of reinforcements, notably when the intermediate part is demountable.

Moreover, the permanent ballast can consist of a plurality of prefabricated elements assembled at the quayside. The assembly can take any of the forms described above. FIG. 5d shows an example of a lower part 4 comprising a plurality of modules 7. According to the example shown the lower part is formed of six triangular modules the assembly of which forms a hexagon.

According to one aspect, the intermediate part (the ballastable buoyancy module) preferably consists of a metal, preferably steel, shell that is either completely watertight (closed shell) or semi-watertight (shell open at the bottom, i.e. open on the side toward the lower part). The semi-watertight shell enables savings in terms of mass and cost for the lower part of the metal shell but cannot guarantee the long term watertightness of this shell because water can circulate between the concrete and the shell. Watertightness of the shell being required only in the deballasted position and therefore very temporarily (installation, maintenance), any entry of water can be compensated by a system of temporary pumps. The intermediate part can also be made of concrete and integrated into the lower part including the permanent ballast 4.

Figures 6A, 6B:
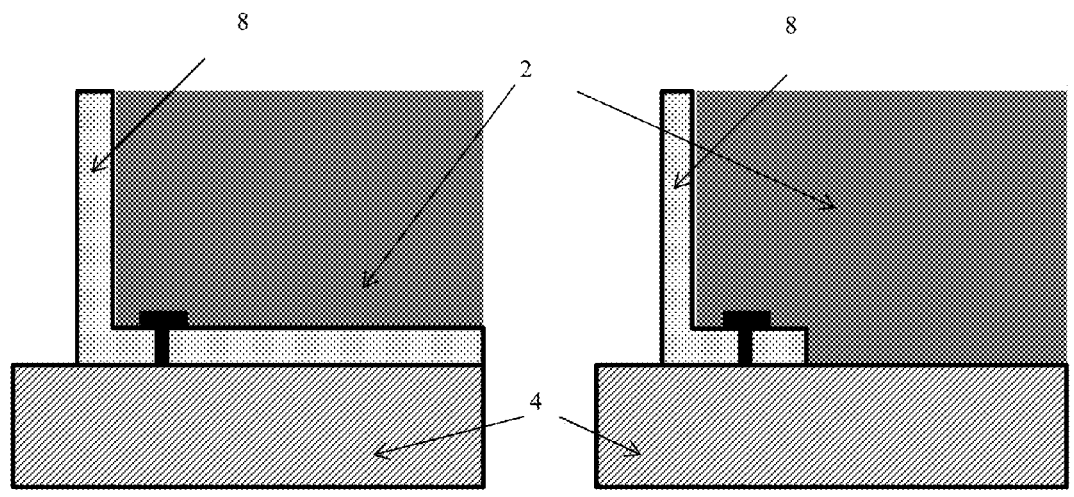
FIGS. 6a and 6b shows variants of the intermediate part of the floating support.

FIG. 6a shows part of an intermediate part 2 for the variant described above in which the intermediate part 2 includes a watertight shell 8 that is closed and has a wall at the level of the lower part 4. In this variant seawater cannot penetrate into the ballast 2.

FIG. 6b shows part of an intermediate part 2 for the variant described above in which the intermediate part 2 includes a semi-watertight shell 8 that has lateral walls but has no wall at the level of the lower part 4. With this variant there is a limited risk of penetration of seawater into the ballast 2.

According to one embodiment of the invention the intermediate part can be made in one piece having a substantially (solid or hollow) cylindrical or toroidal shape. Alternatively the intermediate part can include a plurality of modules distributed continuously or discontinuously on the lower part.

Figures 7A, 7B, 7C:
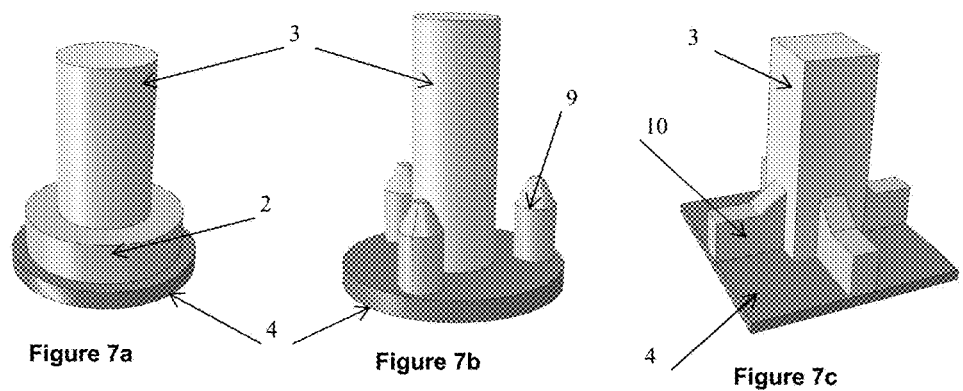
FIGS. 7a to 7e show different variants of the intermediate part of the floating support.

FIG. 7a shows a variant in which the intermediate part 2 is made in one piece and has a cylindrical shape. As shown in a nonlimiting manner the lower part 4 and the upper part 3 are also substantially cylindrical in shape.

FIG. 7b shows a variant in which the intermediate part 2 is formed by a plurality of modules 9. The modules 9 are distributed in a discontinuous manner on the lower part 4. The modules 9 have a substantially cylindrical shape and are spaced from one another and not in contact with the upper part 3. As shown in a nonlimiting manner the lower part 4 and the upper part 3 have a substantially cylindrical shape. Alternatively the modules can be joined to one another or joined to the intermediate part.

FIG. 7c shows a variant in which the intermediate part 2 is formed by a plurality of modules 10. The modules 10 are distributed in a discontinuous manner on the lower part 4. The modules 10 have a substantially parallelepipedal shape and are spaced apart and in contact with the upper part 3. As shown in a nonlimiting manner the lower part 4 and the upper part 3 have a substantially parallelepipedal shape. Alternately the modules can be distributed in a contiguous manner. Moreover, the modules can take other shapes: cylindrical, tubular, etc.

Figures 7D, 7E:
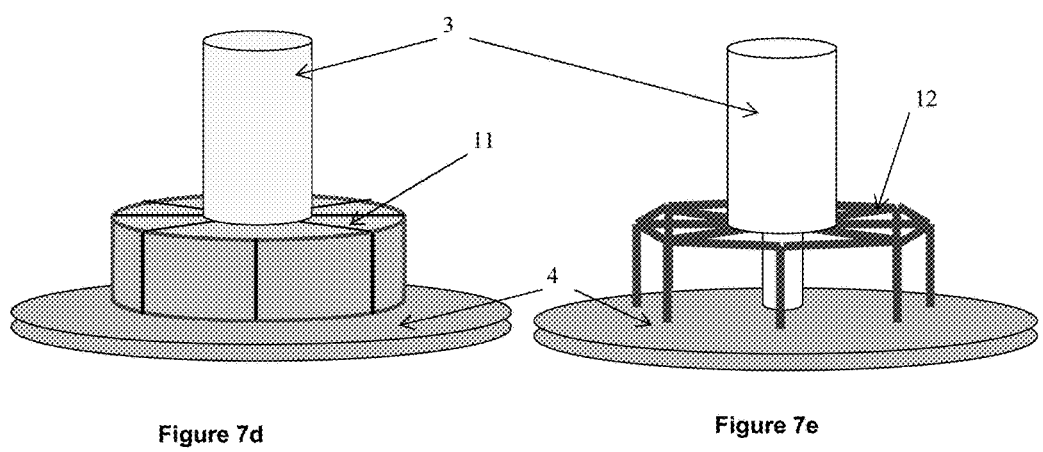

FIGS. 7d and 7e show a variant with and without the buoyancy volumes in which the intermediate part is formed by a plurality of modules 11. The modules 11 are distributed in a continuous manner on the lower part 4 around the upper part 3. The modules 11 can be contained in a structure 12 forming a cage.

The ballastable buoyancy module (the intermediate part) can advantageously be demountable and therefore reused for different floats at the time of their installation. The demountable part is removed when the floating support is in the ballasted position and anchored to the seabed. In this case it no longer provides the transfer of loads to the bottom part. This demountable module can be of toroidal or cylindrical shape or have a shape optimized for simple demounting, or consist of a plurality of elements distributed in a continuous or discontinuous manner. It can equally consist of a plurality of flexible sub-modules enclosed in a cage type structure that enables the transfer of forces to the intermediate and lower parts.

Figures 8A, 8B:
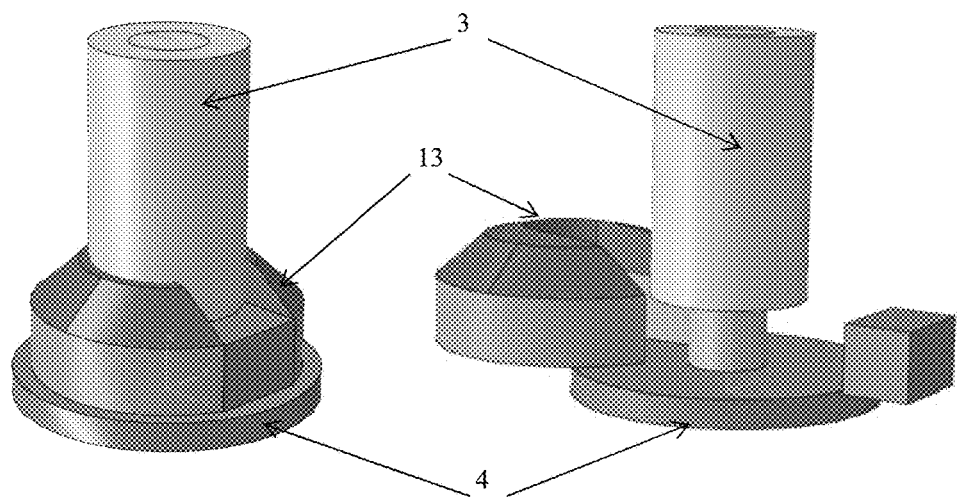
FIGS. 8 and 9 show two variants of the demountable intermediate part of the floating support.

FIGS. 8a and 8b show a variant in which the intermediate part includes a demountable module 13. A module 13 can preferably have a part-cylindrical or frustoconical shape which in the mounted position surrounds the upper part 3 and is arranged on the lower part 4.

Figures 9A, 9B, 9C:
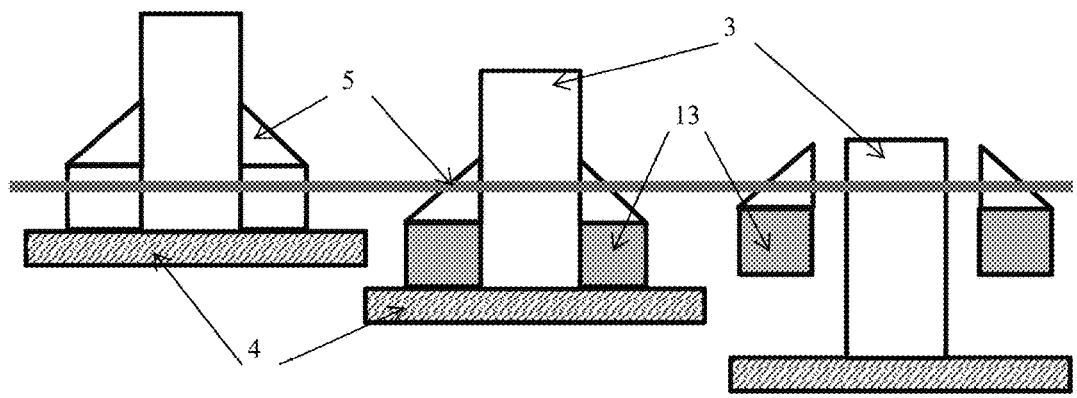

FIGS. 9a to 9c show a variant for different ballasting positions in which the intermediate part includes a plurality of demountable modules 13 surmounted by transition modules 5. The ballasts of the modules 13 are progressively filled and disconnected when the remaining quantity of air provides the necessary buoyancy of the ballasts, which therefore rise to the surface to be towed away afterwards.

For the variants including a transition module, in the transitory ballasting and deballasting phases, in addition to the permanent ballast, the transition module enables the stability of the float to be guaranteed by assuring the continuity of the hydrostatic stiffness as a function of the draft.

To this end, in its upper part, the buoyancy surface of the transition module can decrease substantially continuously to that of the main float (upper part), for example with a conical shape. The angle formed by the cone can therefore be defined in such a manner as to satisfy the stability criteria throughout these operations.

According to a concept of the float including a transition module, the transmission module can be ballastable or non-ballastable. It can also be integrated into the ballastable buoyancy module when the latter is demountable (cf. FIGS. 9a to 9c).

Figures 10A, 10B:
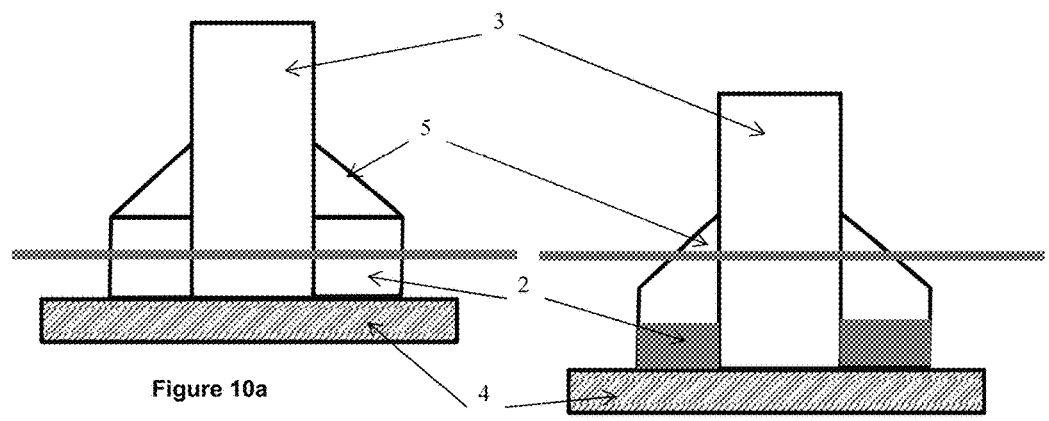
FIGS. 10a to 10d show variants of the transition module of the floating support.

FIGS. 10a and 10b show a variant in which the floating support includes a transition module 5 of substantially frustoconical shape. FIG. 10a corresponds to the deballasted position of the floating support and FIG. 10b corresponds to the ballasted position of the floating support. The transition module 5 is arranged around the upper part 3 and above the intermediate part 2. In the ballasted position the surface of the water is at the level of the transition module 5 which has a cross-section that is smaller (because it is decreasing) than the cross-section of the lower part.

Figures 10C, 10D:
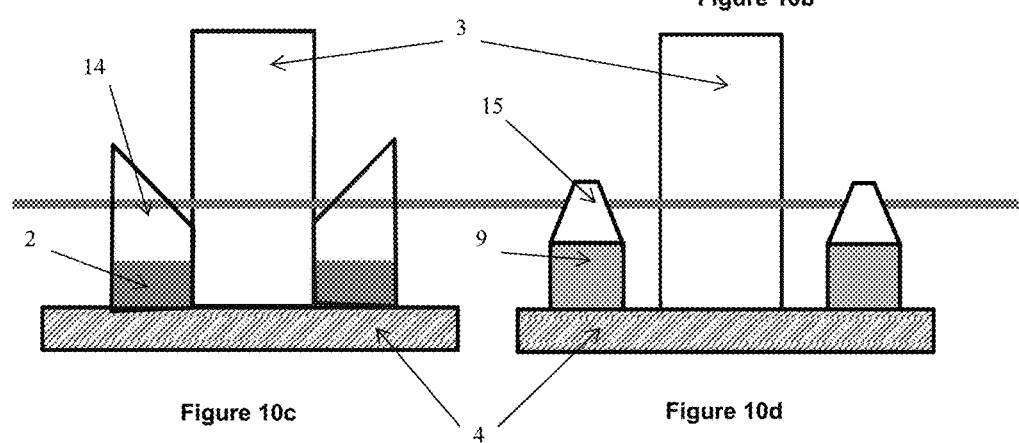

FIG. 10c shows a variant in which the floating support includes a transition module 14. The transition module 14 has a substantially cylindrical shape the outside diameter of which corresponds to the outside diameter of the lower part 2 and that has an inside diameter that decreases with depth.

FIG. 10d shows a variant in which the floating support includes a plurality of transition modules 15 disposed on a plurality of ballasting modules 9. The transition modules 15 have a substantially frustoconical shape.

The upper part provides the buoyancy of the floating support and its shape stability when the float is ballasted. It can additionally absorb some of the forces generated by the wind turbine (or the system to be installed on the floating support) and the anchorages. It is sized so as to be as light as possible so as not to compromise the stability of the float as a whole. To this end it can be made from a lightweight material such as low-density concrete, steel or a steel/composite mix material.

Figures 11A, 11B, 11C:
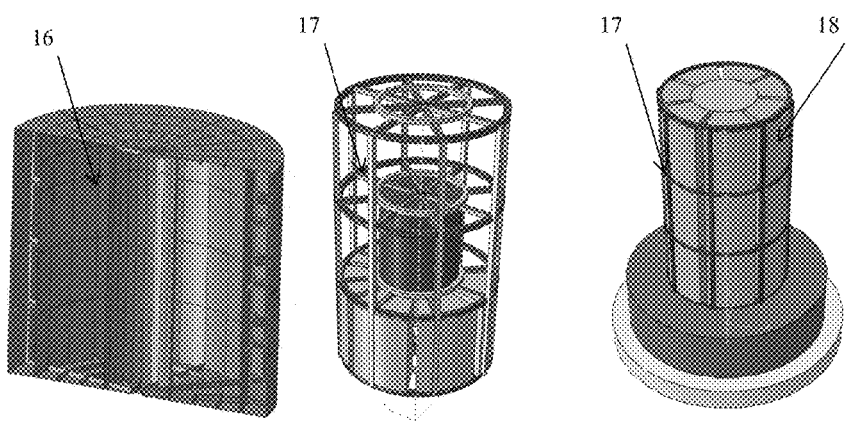
FIGS. 11a, 11b and 11c show two variants of the upper part of the floating support.

The upper part can include a plurality of buoyancy modules. The buoyancy modules can be produced in the form of a double shell system. FIG. 11a shows a variant of a double shell buoyancy module 16 of this kind.

Alternatively the upper part can include a plurality of steel buoyancy modules or flexible buoyancy modules (plastic materials, inflatable structures, foams) distributed inside a non-watertight metal, preferably steel, structure. The metal structure enables the transfer of loads to the bottom part and absorption of some of the forces generated by the wind turbine (or the system installed on the floating support) and the anchorages. FIGS. 11b and 11c show a variant of this kind of the upper part including a metal structure 17 and flexible modules 18.

Moreover, the upper part can have a varying cross-section that increases with depth. Accordingly, during ballasting, the cross-section at the level of the buoyancy surface decreases, which makes it possible to obtain continuity of hydrostatic stiffness with no transition module. For example, the upper part can have at least one portion of substantially conical shape.

The floating support according to the invention may include parts other than those described. Moreover, the floating support can include means for fixing anchor lines.

The present invention also concerns a wind farm installation on a body of water (the sea for example). The installation comprises a vertical axis or horizontal axis wind turbine and a floating support according to any of the combinations of variants described above. The floating support according to the invention provides stability of the wind turbine with a shallow draft and with a deeper draft.

EXAMPLE

In this part an example of the dimensions of a floating support according to the invention is given. The main float (upper part), the ballastable buoyancy module (intermediate part) and the permanent ballast (lower part) are assumed to be of cylindrical shape.

A generic 5 MW wind turbine is installed on the float.

Figure 12:
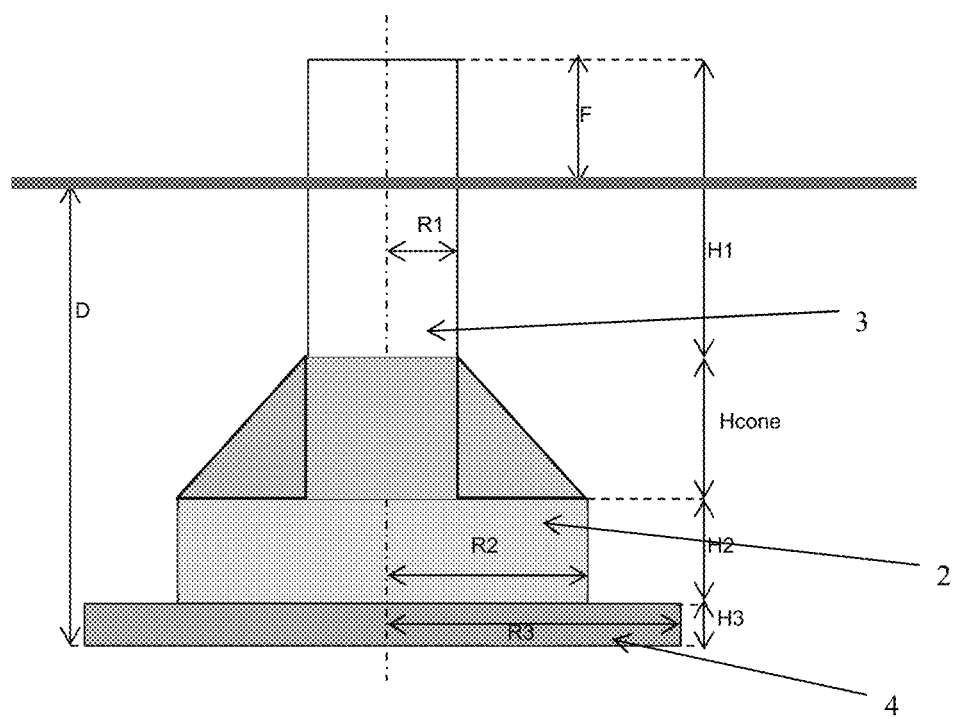
FIG. 12 shows the geometrical parameters of a float according to one embodiment of the invention.

FIG. 12 shows geometrical parameters of a support according to the invention comprising a lower part 4, an intermediate part 2 and an upper part 3.

The floating support to support a 5 MW wind turbine can have the following dimensions:

TABLE 1

| Characteristics of the floating support | |
|---|---|
| R1 | 8 m |
| R2 | 16 m |
| R3 | 22 m |
| H1 | 30 m |
| H2 | 5 m |
| H3 | 2 m |
| Hcone | 16 m |
| Mass of steel | 640 tonnes |
| Mass of concrete | 6 000 tonnes |
| Mass of water | 12 000 tonnes |
| Heave natural period | 30 s |

The floating support according to the example provides the stability of the floating wind turbine in the ballasted position and in the deballasted position.

The invention claimed is:

1. A floating support comprising a lower part containing a permanent ballast, an intermediate part including means for ballasting and deballasting the floating support to vary the draft of the floating support, and an upper part containing buoyancy means, the floating support having a cross-section varying with depth, wherein the second moment of area of the cross-section (Sd) of the floating support at the level of the buoyancy surface (Lfd) of the floating support when deballasted is greater than the second moment of area of the cross-section (Sb) of the floating support at the level of the buoyancy surface (Lfb) of the floating support when ballasted, the buoyancy surface (Sd) of the deballasted floating support being at the level of the intermediate part, and said buoyancy surface (Sb) of the ballasted floating support being at the level of the upper part.

2. The floating support as claimed in claim 1, in which the cross-section (Sd) of the floating support at the level of the buoyancy surface (Lfd) of the deballasted floating support is greater than the cross-section (Sb) of the floating support at the level of the buoyancy surface (Lfb) of the ballasted floating support.

3. The floating support as claimed in claim 1, in which, in a horizontal plane of the floating support, the exterior dimension of the intermediate part is smaller than the exterior dimension of the lower part and larger than the exterior dimension of the upper part.

4. The floating support as claimed in claim 1, in which the permanent ballast is made of reinforced concrete or includes a metal structure filled with a dense material such as concrete or iron filings.

5. The floating support as claimed in claim 1, in which the lower part has a substantially frustoconical, toroidal, parallelepipedal, cylindrical or polygonal shape.

6. The floating support as claimed in claim 1, in which the lower part includes a plurality of assembled modules.

7. The floating support as claimed in claim 1, in which the intermediate part includes an at least partly watertight steel shell.

8. The floating support as claimed in claim 1, in which the intermediate part includes a concrete shell.

9. The floating support as claimed in claim 1, in which the ballast of the ballasting means includes water.

10. The floating support as claimed in claim 1, in which the intermediate part is formed by a solid cylinder, a tube, a torus or by a plurality of modules distributed continuously or discontinuously on the lower part.

11. The floating support as claimed in claim 10, in which the intermediate part is formed by a steel structure and a plurality of modules.

12. The floating support as claimed in claim 1, in which the intermediate part is at least partly demountable so as to be removed when the floating support is ballasted.

13. The floating support as claimed in claim 1, in which the floating support includes a transition module providing g the transition between the intermediate part and the upper part.

14. The support as claimed in claim 13, in which the transition module has a substantially conical or frustoconical shape.

15. The support as claimed in claim 13, in which the transition module is arranged around the upper part.

16. The support as claimed in claim 13, in which the transition module is arranged above at least one module forming the intermediate part.

17. The support as claimed in claim 1, in which the upper part is made of low-density concrete, steel or a steel/composite mix.

18. The support as claimed in claim 1, in which the upper part includes a plurality of modules.

19. Wind turbine installation on a body of water comprising a wind turbine and a floating support as claimed in claim 1, the wind turbine being installed on the floating support.

* * * * *